(12) United States Patent
Ioppolo et al.

(10) Patent No.: US 11,820,268 B2
(45) Date of Patent: Nov. 21, 2023

(54) LUMBAR ADJUSTMENT ASSEMBLY

(71) Applicant: Brose Fahrzeugteile SE & Co. Kommanditgesellschaft, Coburg, Coburg (DE)

(72) Inventors: Leo Ioppolo, Washington Township, MI (US); Richard Mohr, III, Ortonville, MI (US); Matthew Sinke, Royal Oak, MI (US)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 17/714,819

(22) Filed: Apr. 6, 2022

(65) Prior Publication Data
US 2023/0322137 A1  Oct. 12, 2023

(51) Int. Cl.
*B60N 2/66* (2006.01)
*B60N 2/90* (2018.01)

(52) U.S. Cl.
CPC ............ *B60N 2/666* (2015.04); *B60N 2/933* (2018.02)

(58) Field of Classification Search
CPC ................................. B60N 2/666; B60N 2/667
See application file for complete search history.

(56) References Cited

U.S. PATENT DOCUMENTS

| | | | |
|---|---|---|---|
| 10,814,753 B2 | 10/2020 | Eichhorn et al. | |
| 2013/0341982 A1* | 12/2013 | Maierhofer | B60N 2/666 297/284.4 |
| 2015/0305506 A1* | 10/2015 | Suzuki | A47C 3/00 297/284.4 |
| 2016/0250957 A1* | 9/2016 | Yoo | B60N 2/666 297/284.7 |
| 2018/0015860 A1* | 1/2018 | Bhatia | B60N 2/753 |

FOREIGN PATENT DOCUMENTS

| | | | |
|---|---|---|---|
| CN | 112498203 A | * | 3/2021 |
| CN | 114435209 A | * | 5/2022 |
| DE | 102015214480 A1 | * | 3/2016 |
| KR | 101592754 B1 | * | 2/2016 |
| KR | 101664697 B1 | * | 10/2016 |

* cited by examiner

*Primary Examiner* — Timothy J Brindley
(74) *Attorney, Agent, or Firm* — Dickinson Wright PLLC

(57) ABSTRACT

A lumbar adjuster for use in a vehicle seat and including a wire frame, a lumbar mat, an adjustment mechanism, and an arbor. The wire frame configured to be fixed to a backrest and including a first lateral portion, a second lateral portion and a transverse portion extending therebetween. The lumbar mat configured to face towards a backrest cushion when the lumbar adjuster is assembled to the vehicle seat. The adjustment mechanism connected to and configured to move along the first and second lateral portions and including a lever arm and a gear train operatively connected to and operable to articulate the lever arm to move a portion of the lumbar mat towards and away from the backrest cushion. The arbor connected to the transverse portion of the wire frame and the adjustment mechanism to fix the adjustment mechanism relative to the transverse portion.

15 Claims, 7 Drawing Sheets

LUMBAR ADJUSTMENT ASSEMBLY

TECHNICAL FIELD

The present disclosure relates to an adjustment mechanism for a vehicle seat.

BACKGROUND

Vehicle seats generally include a backrest that supports an occupant's back. If the backrest does not provide sufficient support to the occupant's back the occupant may experience back pain or fatigue. This pain and fatigue may be caused by overuse of ligaments and muscles experienced while or prior to the occupant being seated in the vehicle seat. This condition may be exacerbated if the occupant is seated for a prolonged period of time.

SUMMARY

According to one embodiment, a lumbar adjuster for use in a vehicle seat is provided. The lumbar adjuster may include a wire frame, a slider, a carrier, a support lever, and an arbor. The wire frame may be configured to be fixed to a backrest of the vehicle seat and may include a first lateral portion, a second lateral portion, and a transverse portion extending therebetween. The slider may be connected to and configured to move along the first and second lateral portions. The carrier may be connected to and configured to move along the first and second lateral portions. The support lever may be coupled to the carrier and the slider so that as the carrier and the slider are collectively configured to move with one another along the first and second lateral portions. The slider may be configured to move relative to the carrier between a first adjustment position, in which the support lever is in a retracted position and a second adjustment position, in which the support lever is in deployed position to vary a contour of a seating surface of the vehicle seat. The arbor may be connected to the transverse portion of the wire frame and the carrier to fix the carrier relative to the transverse portion.

According to another embodiment, a lumbar adjuster for use in a vehicle seat is provided. The lumbar adjuster may include a wire frame, a lumbar mat, an adjustment mechanism, and an arbor. The wire frame may be configured to be fixed to a backrest of the vehicle seat and the wire frame may include a first lateral portion, a second lateral portion, and a transverse portion extending therebetween. The lumbar may be configured to face towards a backrest cushion when the lumbar adjuster is assembled to the vehicle seat. The adjustment mechanism may be connected to move along the first and second lateral portions and may include a lever arm and a gear train that may be operatively connected to and operable to articulate the lever arm to move a portion of the lumbar mat towards and away from the backrest cushion.

According to yet another embodiment, a backrest assembly for use in a vehicle seat is provided. The backrest assembly may include a pair of side member, a wire frame, a lumbar mat, an adjustment mechanism, and an arbor. The wire frame may be configured to be fixed to each of the side members of the pair of side members and the wire frame may include a first lateral portion, a second lateral portion, and a transverse portion that may extend therebetween. The lumbar mat may be configured to face towards a backrest cushion. The adjustment mechanism may be connected to and configured to move along the first and second lateral portions and may include a lever arm and a gear train that may be operatively connected to and operable to articulate the lever arm to move a portion of the lumbar mat towards and away from the backrest cushion. The arbor may be connected to the transverse portion of the wire frame and the adjustment mechanism to fix a first portion of the adjustment mechanism relative to the transverse portion.

DETAILED DESCRIPTION

Figure 1:
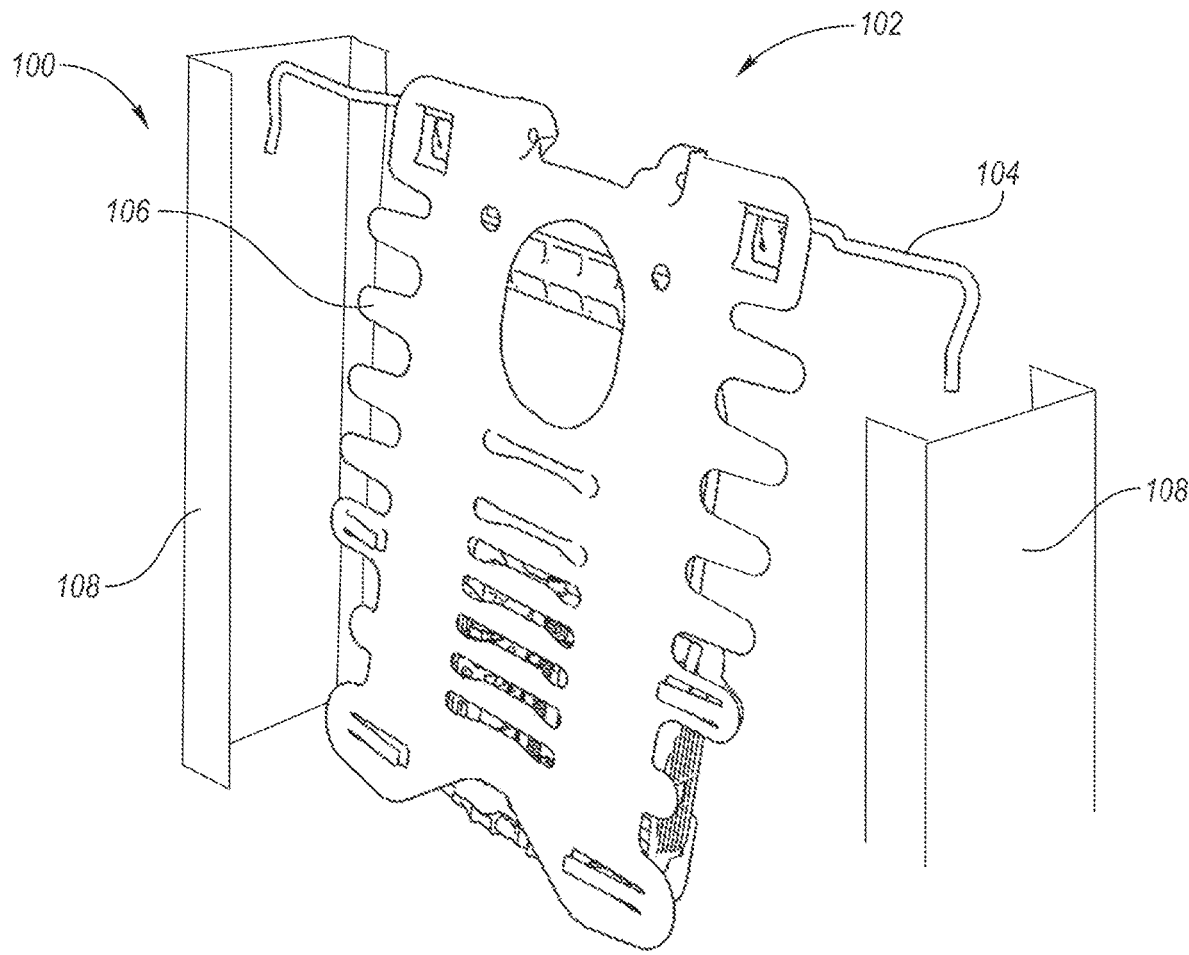
FIG. 1 illustrates a schematic-perspective view of a portion of an exemplary backrest assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A known lumbar adjuster is described in U.S. Pat. No. 10,814,753, which includes an adjustment mechanism that is configured to provide adjustment to a user's lumbar region along four different direction and which is hereby incorporated by reference in its entirety. The known lumbar adjuster includes adjustment mechanism provided with a carrier and a slider. As the slider moves with respect to the carrier, an adjustable support element is moved towards and away from a lumbar mat, so that the contour of the seat back is altered. The carrier of the known lumbar adjuster is configured to carry the slider and adjustable support elements in a vertical direction so that the position of the adjustable support elements may be moved towards between the user's lower and upper lumbar regions. A lumbar adjuster that provides adjustment of the seat back contour as well as adjustment of a vertical position of the adjustment mechanism may be referred to as a four-way lumbar adjuster.

Under certain circumstances, a user may only require a lumbar adjuster that provides adjustment to the contour of the seat back as opposed to a lumbar adjuster that additionally allows for vertical adjustment of the adjustable support elements. Such a lumbar adjuster may be referred to as a two-way lumbar adjuster. It may be desirable to harmonize the design of a four-way lumbar adjuster and the design of a two-way lumbar adjuster to leverage economies of scale so that, for example, a substantial number of components of the four-way lumbar adjuster are also used in a two-way lumbar adjuster. Moreover, if a substantial number of the components of the four-way lumbar adjuster and the two-way lumbar adjuster are common, the four-way and two-way lumbar adjusters may be produced from common or substantially common assembly lines.

The present disclosure attempts to address this goal to harmonize the design of a four-way lumbar adjuster and a two-way lumbar adjuster.

Referring to FIG. 1, a perspective view of a portion of a vehicle seat including a backrest assembly 100 is illustrated. The backrest assembly 100 may include a lumbar adjuster or lumbar adjustment assembly 102 that may include a wire frame 104 and a lumbar mat 106 that be fixed to one or more portions of the wire frame 104. One or more portions, such as end portions, of the wire frame 104 may be configured to engage or be fixed to side members 108 of the backrest assembly 100. The lumbar adjustment assembly 102 may be arranged within the side members 108 so that the lumbar mat 106 faces a cushion or seating surface (not illustrated) and the lumbar adjustment assembly 102 may include an adjustment mechanism 110 (FIG. 2) that may be operable to deflect one or more portions of the lumbar mat 106 to alter a contour of the lumbar mat 106 or the seating surface.

Figure 2:
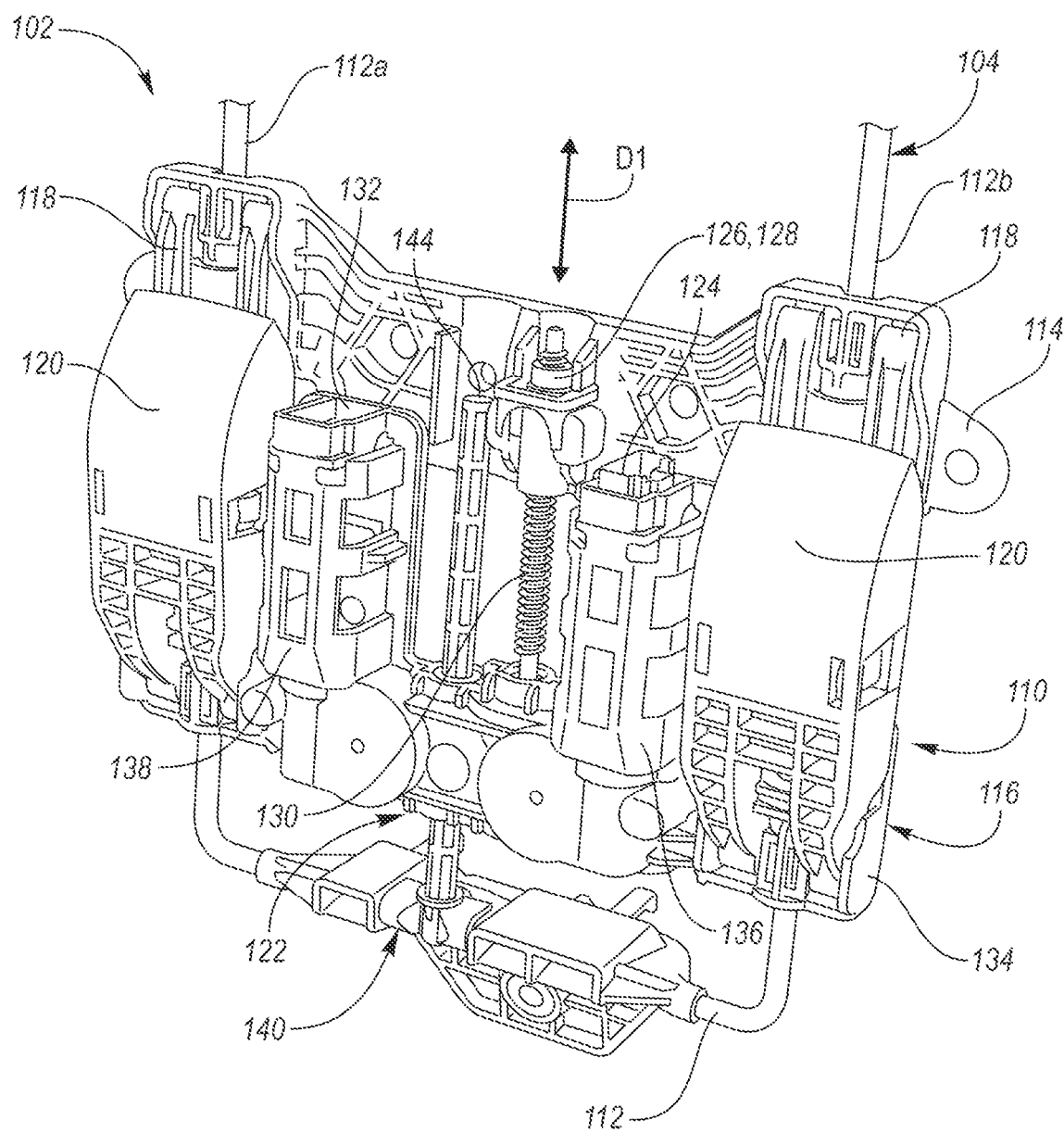
FIG. 2 illustrates a perspective view of an exemplary lumbar adjuster assembly.

FIG. 2 illustrates a perspective view of a portion of the lumbar adjustment assembly 102 according to one or more embodiments. The wire frame 104 of the lumbar adjustment assembly 102 may include first and second lateral portions 112a, 112b and a transverse portion 112 extending therebetween. As mentioned above, the lumbar assembly 102 may include the adjustment mechanism 110 that may be configured to engage and adjust a contour of the lumbar mat 106. The adjustment mechanism 110 may include a slider 114 and a carrier 116. The slider 114 may be spaced apart from the carrier 116, such as above the carrier 116. The slider 114 may be fixed to and configured to slide along the first and second lateral portions 112a, 112b of the wire frame 104. As an example, the slider 114 may be configured to move along the first and second lateral portions 112a, 112b in a direction indicated by directional arrow D1.

The adjustment mechanism 110 may include one or more levers that may be configured to articulate with respect to the slider 114, the carrier 116, or both to engage and alter the contour of the lumbar mat 106 (FIG. 1). As an example, the levers may include one or more lever arms 118 and one or more adjustment paddles 120 that may cooperate with one another so that the adjustment paddles 120 articulate to engage the lumbar mat 106. As an example, the lever arms 118 may be pivotally coupled to the slider 114 and to the adjustment paddles 120, so that as the slider 114 moves towards the carrier 116, the lever arms 118 may bias each of the adjustment paddles 120 towards and away from the lumbar mat 106.

The adjustment mechanism 110 may include a gear train 122 and a number of motors (e.g., one motor 124) that may be collectively configured to adjust the slider 114 along the first and second lateral portions 112a, 112b. The gear train 122 may include a spindle assembly 126 that may include a spindle nut 128 that may be fixed to the slider 114. As will be described in greater detail below, actuation of the motor 124 may drive a spindle 130 of the spindle assembly 126 so that the spindle nut 128 and the slider 114 translate in the vertical direction as indicated by the bi-directional arrow D1 to actuate the lever arms 118 and the adjustment paddles 120. In one or more embodiments, the carrier 116 may include a base member 132 and a cover 134. The cover 134 may include one or more cages, such as a first cage 136 and a second cage 138, the first cage 136 may house the motor 124.

To convert the lumbar adjustment assembly 102 from a four-way adjustment configuration, in which the slider 114 and the carrier 116 are collectively configured to move along the wire frame 104, to a two-way adjustment configuration, in which only the slider 114 is configured to move along the wire frame 104, a fixation member such as an arbor 140 may be provided. The arbor 140 may be configured to fix the carrier 116 to prevent the carrier 116 relative to the transverse portion 112 of the wire frame 104.

Figure 3:
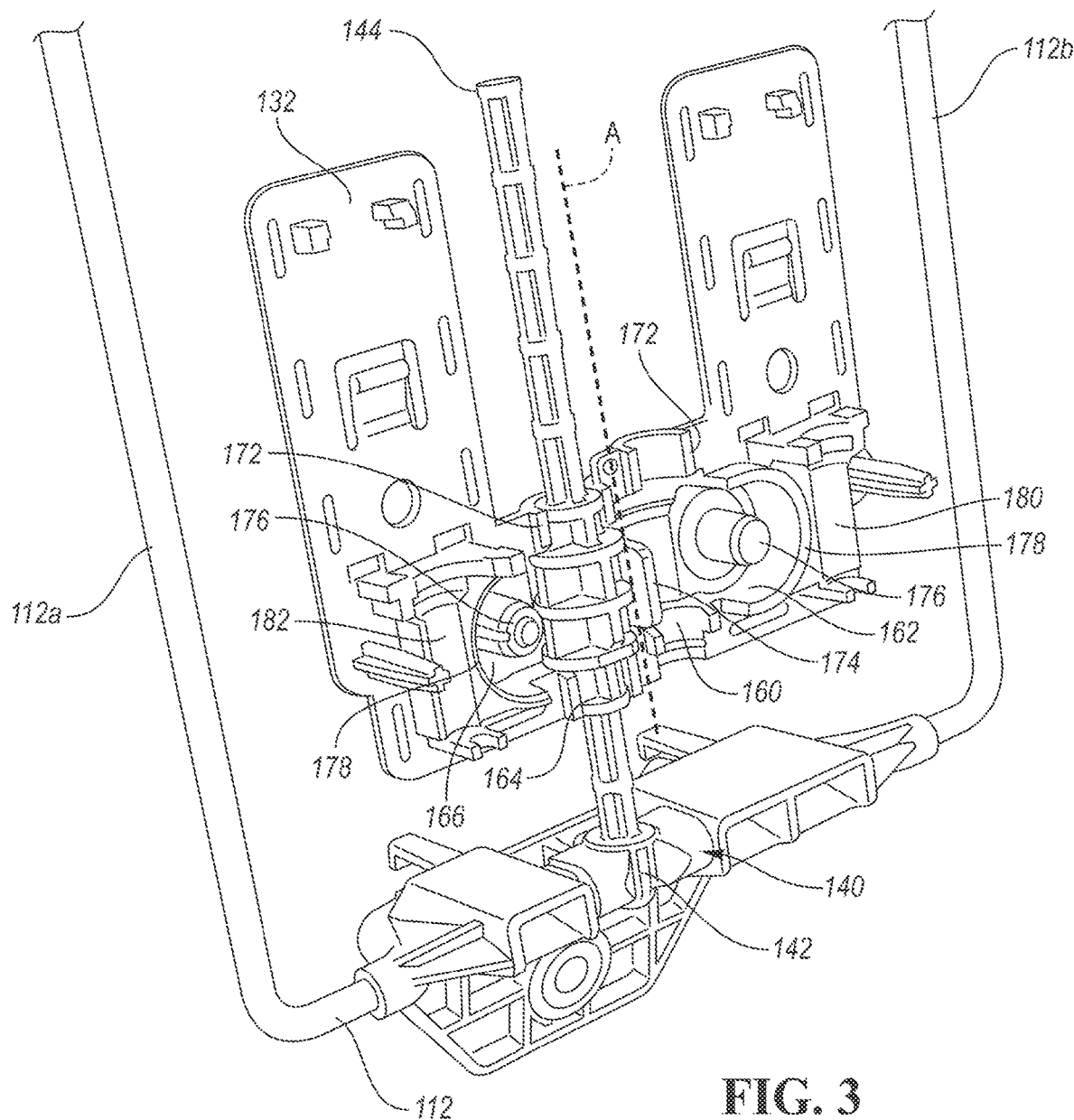
FIG. 3 illustrates a perspective view of a portion of the exemplary lumbar adjuster assembly illustrated in FIG. 2.
Figure 5:
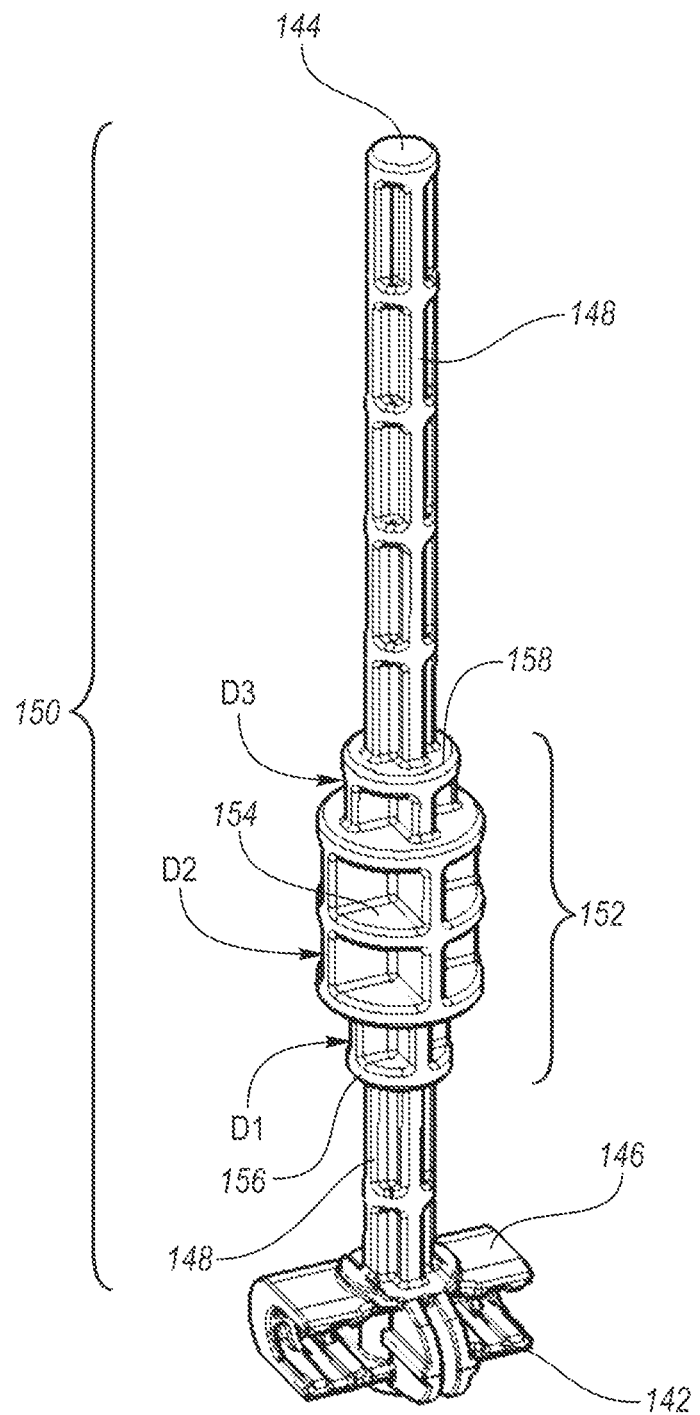
FIG. 5 illustrates a perspective view of an arbor of the exemplary lumbar adjuster assembly illustrated in FIG. 2.

FIG. 3 illustrates a perspective view of a portion of the lumbar adjustment assembly 102. For purposes of clarity, the lumbar mat 106, the cover 134 of the carrier 116, lever arms 118 and adjustable paddles 120 are not illustrated. FIG. 5 illustrates a perspective view of the arbor 140. The arbor 140 may include a first end 142 and a second end 144 that may overlap or cover one or more portions of the slider 114. The first end 142 may include an attachment member 146 that may engage the transverse portion 112 so that the attachment member 146 is fixed to the transverse portion (e.g., by a force-fit condition).

The arbor 140 may include a shaft or one or more shaft portions 148 that may form portions of or extend between the first end 142 and the second end 144 of the arbor 140. A medial portion 150 of the arbor 140 may include the shaft 148 and an engagement member 152. The engagement member 152 may be configured to be fixed to the carrier 116. As an example, the engagement member 152 may be sandwiched between the cover 134 and the base member 132 so that the carrier 116 is fixed to the transverse portion 112. The engagement member 152 may form a non-uniform outer diameter that may engage portions of the base member 132 and the cover 134. forms a first outer diameter, and the shaft forms a second outer diameter, wherein the second outer diameter is less than the first outer diameter.

In one or more embodiments, the engagement member 152 may include a barrel 154, a first collar 156, and a second collar 158. The first collar 156 may extend between the barrel 154 and a first portion of the shaft 148 and the second collar 158 may extend between the barrel 154 and a second portion of the shaft 148. The first collar 156 may define a first diameter D1, the barrel 154 may define a second diameter D2, and the second collar 158 may define a third diameter D3. As an example, the second diameter D2 may be greater than the first diameter D1, the third diameter D3, or both the first and third diameters D1, D3. The shaft portions 148, the first and second collars 156, 158, the barrel 154 and the attachment member 146 may be formed as one piece such as by injection molding or another process, as required. As another example, the arbor 140 may be composed of individual components that may be assembled or fixed to one another.

Figure 4:
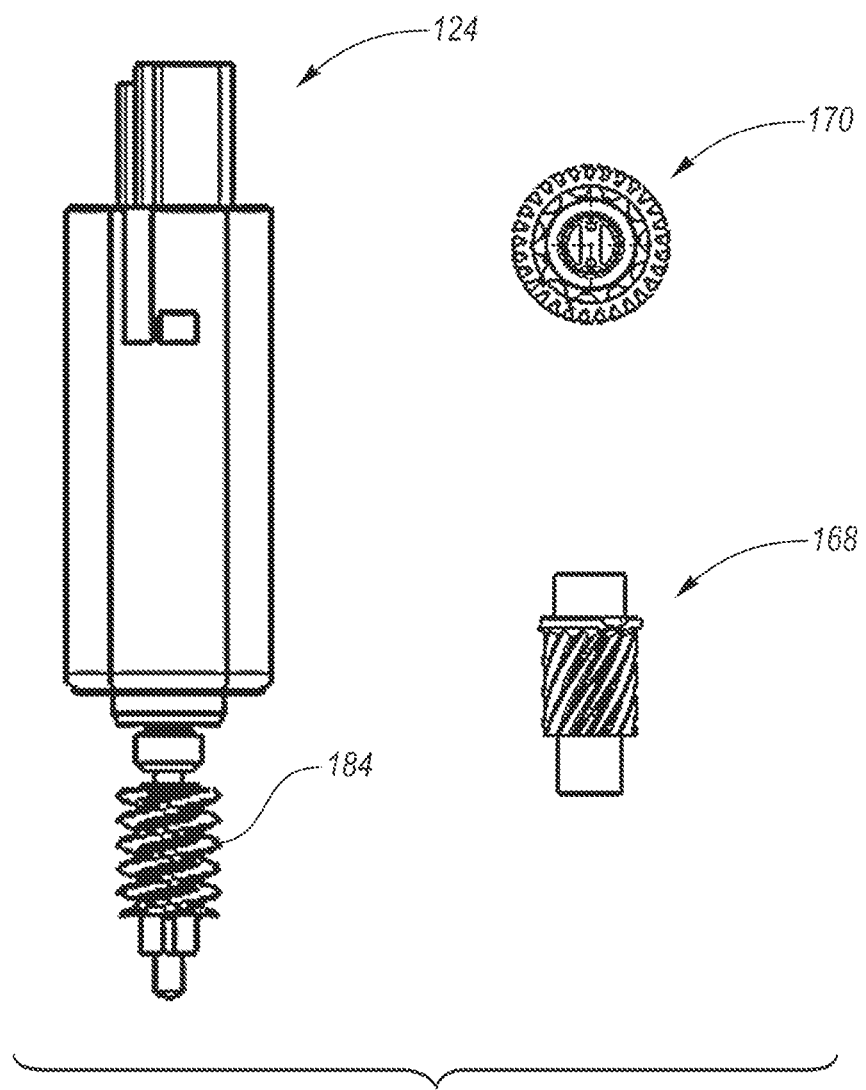
FIG. 4 illustrates a plan view of portions of the exemplary lumbar adjuster assembly illustrated in FIG. 3.

The base member 132 may define a number of channels and recesses to house the engagement member 152 and portions of the gear train 122. As an example, a first channel 160 and a first recess 162 may be disposed on a first side of an axis of symmetry A and a second channel 164 and second recess 166 may be disposed on the other side of the axis of symmetry A. The first channel 160 may be configured to receive a spindle nut 168 (FIG. 4) of the gear train 122 and the first recess 162 may be configured to receive a gear wheel 170 (FIG. 4). The second channel 164 and the second recess 166 may be symmetrical with respect to the first channel 160 and the first recess 162 and the second channel 164 may be configured to receive the engagement member 152 of the arbor 140.

The base member 132 may include a number of retention members that may be configured to fix components of the gear train 122. As an example, one or more retention flanges 172 may be formed in the base member and positioned along peripheral portions of the first and second channels 160, 164. The retention flanges 172 may be configured to engage portions of the spindle nut 168 (FIG. 4) and the first and second collars 156, 158. The retention tab 174 may extend from a portion of the base member 132 that is disposed between the first and second channels 160, 164. The retention tab 174 may be configured to engage the barrel 154 of the arbor 140 to prevent the arbor 140 from moving in a lateral direction, such as towards the first and second channels 160, 164.

In one or more embodiments, the base member 132 may define third and fourth channels 180, 182 that may each be configured (e.g., sized and shaped) to receive portions of a worm gear 184 (FIG. 4) that may be attached to a driveshaft of the motor 124. Outer peripheral portions of the first and second recesses 162, 166 may form one or more bearing surfaces 178 (e.g., two). The bearing surfaces 178 may be configured to support portions of the gear wheel 170 (e.g., such as an axial face). One or more posts 176 may be disposed within the first and second recesses 162, 166 and configured to support portions of the gear wheel 170 so that the gear wheel 170 (FIG. 4) may be centered with respect to each of the recesses 162, 166.

Figure 6A:
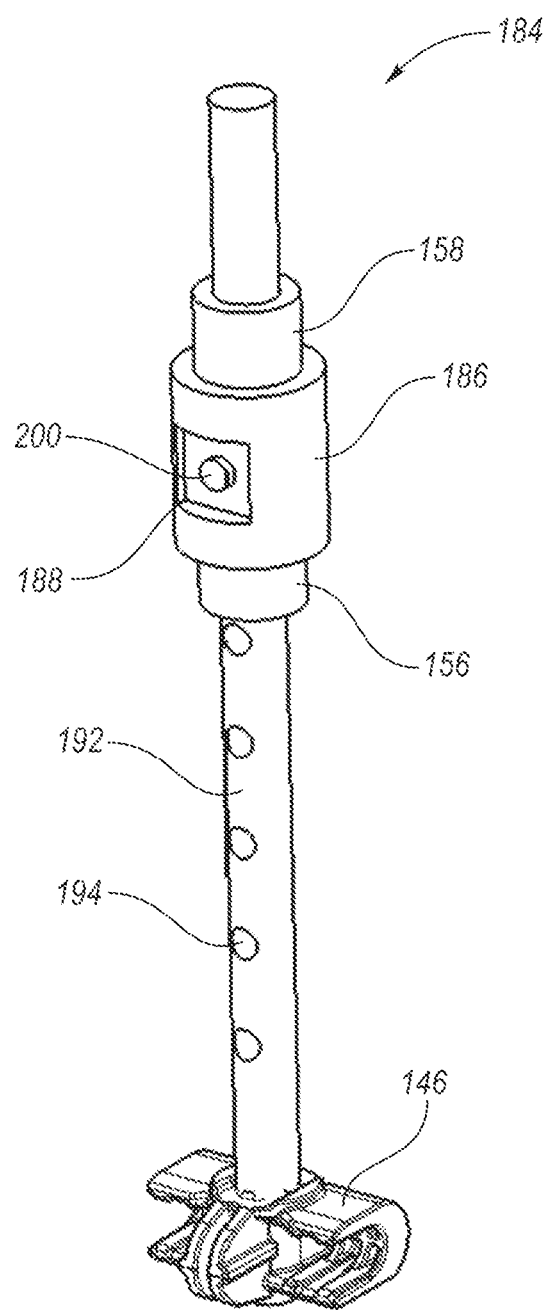
FIG. 6A and FIG. 6B illustrate perspective views of an arbor according to another embodiment.
Figure 6B:
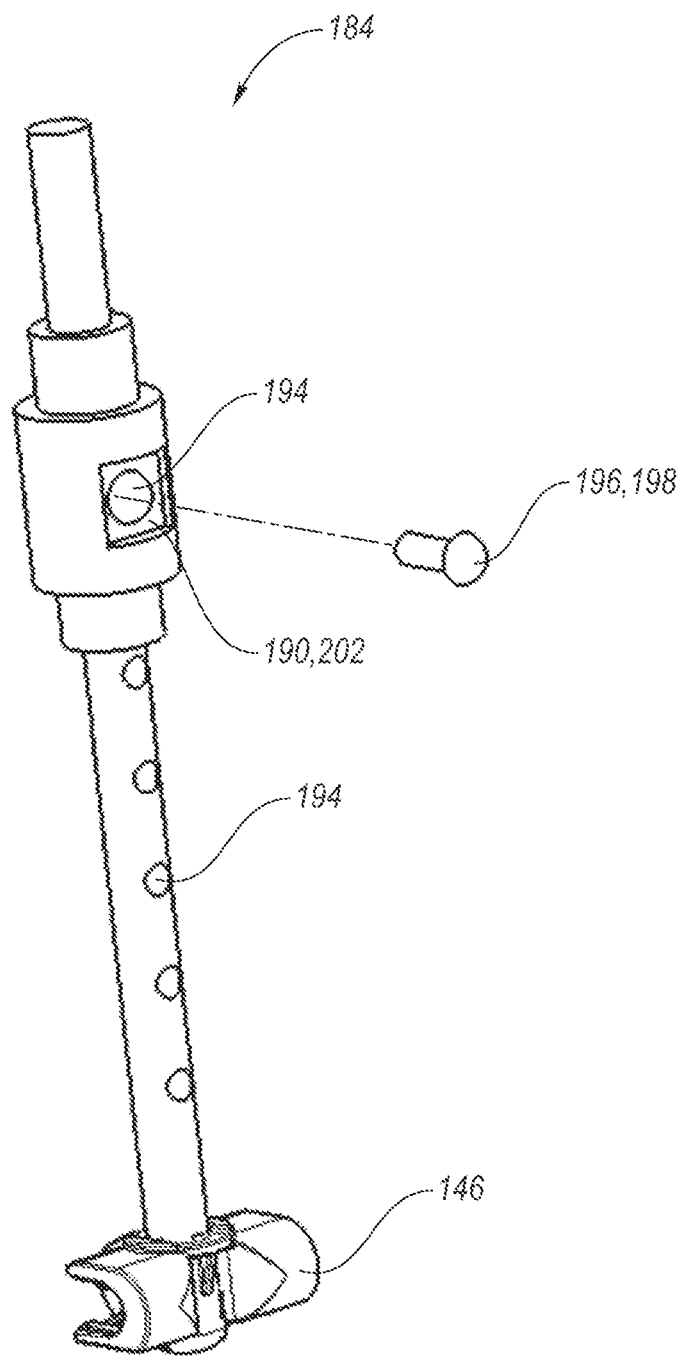

FIG. 6A and FIG. 6B illustrate perspective views of an adjustable arbor 184 according to one or more embodiments. Components that are common between the arbor 140 and the adjustable arbor are identified by common reference numbers and the description of those common components provided above apply to the adjustable arbor 184. The adjustable arbor 184 may allow for adjusting the position of the carrier 116 with respect to the to transverse portion 112 of the wire frame 104. As an example, one vehicle or one seat may require the carrier 116 to be positioned further away from or closer to the transverse portion 112 so that the adjustment paddles 120 may alter higher or lower portions of the backrest surface.

The adjustable arbor 184 may include an adjustable engagement member 186 and a shaft 192. The adjustable engagement member 186 may be fixed (e.g., selectively) in a number of positions of along the shaft 192. The adjustable engagement member 186 may define one or more openings, such as a first opening 188 and a second opening 190 that may oppose the first opening 188. As an example, the second opening 190 may provide access to a recessed surface 202. The shaft 192 may define a number of adjustment apertures 194 that may be distributed along the shaft 192. A fastener 196 (e.g., pin, screw, clip) may be inserted into the second opening and into one of the adjustment aperture 194 to fix the adjustable engagement member 186 to a desired location of the shaft 192. The fastener 196 may include a head 198 that may engage the recessed surface 202 to secure the adjustable engagement member 186 to the shaft 192. As an example, when the fastener 196 is inserted into the adjustable engagement member 186, a bottom end 200 of the fastener 196 may extend into the first opening 188.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 assembly
102 lumbar adjustment assembly
102 lumbar assembly
104 wire frame
106 lumbar mat
108 side members
110 adjustment mechanism
112 transverse portion
112a first lateral portions
112b second lateral portions
114 slider
114 transverse portion
116 carrier
118 lever arms
120 adjustment paddles
122 gear train
124 one motor
124 motor
126 spindle assembly
128 spindle nut
130 spindle
132 base member
134 cover
36 first cage
138 second cage
140 arbor
142 first end—arbor
144 second end—arbor
146 attachment member
148 shaft
150 medial portion
152 engagement member
154 barrel
156 first collar
158 second collar
160 first channel
162 first recess 164 second channel
166 second recess
168 spindle nut
170 gear wheel
172 retention flange
174 retention tab
176 post
178 bearing surface
180 third recess
182 fourth recess
184 adjustable arbor
186 adjustable engagement member
188 first opening
190 second opening
192 shaft
194 adjustment apertures
196 fastener
198 head of fastener
200 bottom of fastener
202 recessed surface

What is claimed is:

1. A lumbar adjuster for use in a vehicle seat, the lumbar adjuster comprising:
a wire frame configured to be fixed to a backrest of the vehicle seat and including a first lateral portion, a second lateral portion and a transverse portion extending therebetween;
a slider connected to and configured to move along the first and second lateral portions;
a carrier connected to the first and second lateral portions;
a support lever coupled to the carrier and the slider,
wherein the slider is configured to move relative to the carrier between a first adjustment position, in which the support lever is in a retracted position and a second adjustment position, in which the support lever is in deployed position to vary a contour of a seating surface of the vehicle seat; and
an arbor connected to the transverse portion of the wire frame and the carrier to fix the carrier relative to the transverse portion
wherein the arbor includes a first end, a second end, and a medial portion extending therebetween, wherein the medial portion includes a shaft and an engagement member, wherein the engagement member is configured to be fixed to the carrier,
wherein the engagement member includes a barrel and a first collar extending between the barrel and a first portion of the shaft, wherein an outer diameter of the barrel and an outer diameter of the first collar are non-uniform.

2. The lumbar adjuster of claim 1, wherein the arbor includes a first end forming an attachment member configured to engage the transverse portion of the wire frame.

3. The lumbar adjuster of claim 1, wherein the engagement member forms a first outer diameter, and the shaft forms a second outer diameter, wherein the second outer diameter is less than the first outer diameter.

4. The lumbar adjuster of claim 1, wherein the engagement member includes a second collar extending between the barrel and a second portion of the shaft.

5. The lumbar adjuster of claim 1, wherein the first portion of the shaft extends from the first collar and terminates at a free end.

6. The lumbar adjuster of claim 1, wherein the free end of the first portion of the shaft covers at least a portion of the slider.

7. The lumbar adjuster of claim 1, wherein the second portion of the shaft includes a distal end fixed to the transverse portion of the wire frame.

8. A lumbar adjuster for use in a vehicle seat, the lumbar adjuster comprising:
a wire frame configured to be fixed to a backrest of the vehicle seat and including a first lateral portion, a second lateral portion and a transverse portion extending therebetween;
a lumbar mat configured to face towards a backrest cushion when the lumbar adjuster is assembled to the vehicle seat;
an adjustment mechanism connected to and configured to move along the first and second lateral portions, the adjustment mechanism including a lever arm and a gear train operatively connected to and operable to articulate the lever arm to move a portion of the lumbar mat towards and away from the backrest cushion; and
an arbor connected to the transverse portion of the wire frame and the adjustment mechanism to fix the adjustment mechanism relative to the transverse portion,
wherein the adjustment mechanism includes a base member and a cover, the base member connected to and configured to move along the first and second lateral portions, wherein the base member and the cover sandwich at least one portion of the arbor,
wherein at least one of the base member and the cover defines a first channel, a second channel, and a first recess, wherein the gear train includes a spindle nut, disposed in the first channel, and a gear wheel disposed in the first recess and meshed with the spindle nut, the at least one portion of the arbor is at least partially disposed in the second channel, and
wherein the first channel and the second channel are symmetrical about an axis of symmetry extending through the at least one of the base member and the cover.

9. The lumbar adjuster of claim 8, wherein the at least one of the base member and the cover defines a second recess configured to receive a second gear wheel.

10. The lumbar adjuster of claim 8, wherein the arbor includes a shaft and the at least one portion of the arbor is formed by an engagement member, the shaft defining a first outer diameter and the engagement member including a first portion defining a second outer diameter, the second outer diameter is greater than the first outer diameter.

11. A backrest assembly for use in a vehicle seat, the backrest assembly comprising:
a pair of side members;
a wire frame configured to be fixed to each of the side members of the pair side members, the wire frame including a first lateral portion, a second lateral portion, and a transverse portion extending therebetween;
a lumbar mat configured to face towards a backrest cushion;
an adjustment mechanism connected to and configured to move along the first and second lateral portions, the adjustment mechanism including a lever arm and a gear train operatively connected to and operable to articulate the lever arm to move a portion of the lumbar mat towards and away from the backrest cushion; and
an arbor connected to the transverse portion of the wire frame and the adjustment mechanism to fix a first portion of the adjustment mechanism relative to the transverse portion,
wherein the arbor includes a first end, a second end, and a medial portion extending therebetween, wherein the medial portion includes a shaft and an engagement member, wherein the engagement member is configured to be fixed to the carrier, and wherein the engagement member includes a barrel and a first collar extending between the barrel and a first portion of the shaft, wherein an outer diameter of the barrel and an outer diameter of the first collar are non-uniform.

12. The backrest assembly of claim 11, wherein the adjustment mechanism includes a carrier and a slider, the first portion of the adjustment mechanism is formed by the carrier and a second portion of the adjustment mechanism is formed by the slider, wherein the lever arm is configured to articulate as the slider moves relative to the carrier.

13. The backrest assembly of claim 12, wherein the carrier includes a base member defining a channel and the arbor includes an engagement member inserted into the channel.

14. The backrest assembly of claim 13, wherein the arbor includes a shaft extend from the engagement member, wherein the engagement member and shaft are integral to one another.

15. The backrest assembly of claim 14, wherein the arbor is formed of one or more plastic materials.

\* \* \* \* \*